(12) United States Patent
Kazmi et al.

(10) Patent No.: US 9,055,453 B2
(45) Date of Patent: Jun. 9, 2015

(54) NODE AND METHOD FOR ADAPTING PARALLEL MEASUREMENTS WITH RESPECT TO AN ENHANCED RECEIVER

(75) Inventors: Muhammad Kazmi, Bromma (SE); Iana Siomina, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 246 days.

(21) Appl. No.: 13/698,132

(22) PCT Filed: Sep. 14, 2012

(86) PCT No.: PCT/SE2012/050973
§ 371 (c)(1),
(2), (4) Date: Nov. 15, 2012

(87) PCT Pub. No.: WO2013/115694
PCT Pub. Date: Aug. 8, 2013

(65) Prior Publication Data
US 2013/0201848 A1    Aug. 8, 2013

Related U.S. Application Data

(60) Provisional application No. 61/594,410, filed on Feb. 3, 2012.

(51) Int. Cl.
| | | |
|---|---|---|
| H04W 24/00 | (2009.01) | |
| H04W 48/16 | (2009.01) | |
| H04W 24/10 | (2009.01) | |
| H04W 36/00 | (2009.01) | |

(Continued)

(52) U.S. Cl.
CPC .............. H04W 24/00 (2013.01); H04W 24/10 (2013.01); H04W 36/0094 (2013.01); H04W 48/12 (2013.01); H04W 48/16 (2013.01); H04W 84/045 (2013.01)

(58) Field of Classification Search
None
See application file for complete search history.

(56) References Cited

U.S. PATENT DOCUMENTS

| | | | |
|---|---|---|---|
| 2006/0013179 A1* | 1/2006 | Yamane .................. | 370/338 |
| 2007/0010241 A1* | 1/2007 | Wachter et al. ......... | 455/423 |
| 2009/0135787 A1* | 5/2009 | Uemura et al. ......... | 370/335 |

(Continued)

FOREIGN PATENT DOCUMENTS

WO      2011142715 A1     11/2011

OTHER PUBLICATIONS

3rd Generation Partnership Project. "Measurement requirements for LTE." 3GPP TSG-RAN WG4 Meeting #41, R4-061245, Riga, Latvia, Nov. 5-10, 2006.

(Continued)

*Primary Examiner* — Kerri Rose
(74) *Attorney, Agent, or Firm* — Murphy, Bilak & Homiller, PLLC

(57) ABSTRACT

Techniques for adapting parallel measurements and/or channel receptions when an enhanced receiver is in use. An example radio node obtains information associated with parallel measurements and/or information associated with channel receptions, as well as information related to interference, and adapts a number of current parallel measurements and/or channel information based on the obtained information and at least one characteristic of an enhanced receiver. Other embodiments include a network node adapted to configure measurements and/or channel receptions for a radio node by accounting for an enhanced receiver utilization.

40 Claims, 7 Drawing Sheets

(51) Int. Cl.
*H04W 48/12* (2009.01)
*H04W 84/04* (2009.01)

(56) References Cited

U.S. PATENT DOCUMENTS

2010/0284355 A1* 11/2010 Jung et al. ............... 370/329
2012/0046030 A1* 2/2012 Siomina et al. ........... 455/423
2013/0065612 A1* 3/2013 Siomina et al. ........... 455/456.2
2013/0182583 A1* 7/2013 Siomina et al. ........... 370/252

OTHER PUBLICATIONS

3rd Generation Partnership Project. "Measurement Reporting Criteria Requirements in CELL_DCH." 3GPP TSG-WG4 Meeting #59, R4-112683, Barcelona, Spain, May 9-13, 2011.

* cited by examiner

NODE AND METHOD FOR ADAPTING PARALLEL MEASUREMENTS WITH RESPECT TO AN ENHANCED RECEIVER

TECHNICAL FIELD

Example embodiments presented herein are directed towards a radio node, and corresponding method therein, for adapting parallel measurements and/or channel receptions when an enhanced receiver is in use. Example embodiments presented herein are also directed towards a network node, and method therein, for configuring measurements and/or channel receptions for a radio node by accounting for an enhanced receiver utilization.

BACKGROUND

Overview of Interference Cancellation/Mitigation Capable Receivers

In UMTS/HSDPA several interference aware receivers have been specified for the user equipment. They are termed as 'enhanced receivers' as opposed to the baseline receiver or rake receiver. The UMTS enhanced receivers are referred to as an enhanced receiver type 1 (with a two-branch receiver diversity), enhanced receiver type 2 (with a single-branch equalizer), enhanced receiver type 3 (with a two branch receiver diversity and equalizer) and enhanced receiver type 3i (with a two branch receiver diversity and inter-cell interference cancellation capability). The new receivers may be used to improve performance, for example, in terms of throughput and/or coverage.

In LTE Release 10, enhanced interference coordination techniques have been developed to mitigate potentially high interference, for example, in a cell range expansion zone, while providing the user equipment with time-domain measurement restriction information. Furthermore, for LTE Release11, advanced receivers based on Minimum Mean Square Error-Interference Rejection Combining (MMSE-IRC) with several covariance estimation techniques and interference-cancellation-capable receivers are being currently studied. In the future, even more complex advanced receivers such as Minimum Mean Square Error-Successive Interference Cancellation (MMSE-SIC), which are capable of performing nonlinear subtractive-type interference cancellation, may be used to further enhance system performance.

Such techniques generally may benefit all deployments where relatively high interference of one or more signals is experienced when performing measurements on radio signals or channels transmitted by radio nodes or devices, but are particularly useful in heterogeneous deployments.

However, these techniques also involve additional complexity and may, for example, require more processing power and/or more memory. Due to these factors such receivers may be used by the user equipment for mitigating interference on specific signals or channels. For example, a user equipment may apply an interference mitigation or cancellation technique only on a data channel. In another example a more sophisticated user equipment may apply interference mitigation on a data channel as well as on one or two common control signals. Examples of common control signals are reference signals, synchronization signals, etc.

It should be noted that the terms interference mitigation receiver, interference cancellation receiver, interference suppression receiver, interference rejection receiver, interference aware receiver, interference avoidance receiver, etc. are used interchangeably, but these terms all belong to a category of an advanced receiver or an enhanced receiver. All the different types of advanced receivers improve performance by fully or partly eliminating the interference arising from at least one interfering source. The interfering source is generally the strongest interferer(s), which are signals from the neighboring cells when the action is performed in the user equipment. Therefore, a more generic term, 'enhanced receiver', which covers all variants of an advanced receiver, is used hereinafter. Furthermore, the corresponding interference handling techniques (e.g., interference cancellation, interference suppression, or interference rejection combining) for enhanced receivers are termed 'enhanced receiver techniques' herein.

Heterogeneous Deployments

In 3GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, for example, small geographical areas with a higher user density and/or higher traffic intensity where installation of pico nodes can be considered to enhance performance. Heterogeneous deployments may also be viewed as a way of densifying networks to adopt for traffic needs and the environment. However, heterogeneous deployments also bring challenges for which the network has to be prepared to ensure efficient network operation and superior user experience. Some challenges are related to the increased interference in the attempt to increase small cells associated with low-power nodes, which is also known as cell range expansion. The other challenges are related to potentially high interferences in uplink due to a mix of large and small cells.

According to 3GPP, heterogeneous deployments comprise deployments where low power nodes are placed throughout a macro-cell layout. The interference characteristics in a heterogeneous deployment can be significantly different than in a homogeneous deployment, in downlink or uplink or both.

Examples hereof with Closed Subscriber Group (CSG) cells are given in FIG. 1, where in case (a), a macro user with no access to the CSG cell will be interfered by the HeNB, in case (b) a macro user causes severe interference towards the HeNB and in case (c), a CSG user is interfered by another CSG HeNB. Heterogeneous deployments, however, are not limited to those with CSG involved.

Another example is illustrated in FIG. 2, where the need for enhanced ICIC techniques for DL is particularly crucial when the cell assignment rule diverges from the RSRP-based approach, for example, towards pathloss- or pathgain-based approach, sometimes also referred to as the cell range expansion when adopted for cells with a transmission power lower than neighbor cells. In FIG. 2, the cell range expansion of a pico cell is implemented by means of a parameter $\Delta$. The pico cell is expanded without increasing its power, just by changing the reselection threshold, for example, the user equipment selects the cell of the pico BS as the serving cell when $RSRP_{pico} + \Delta \geq RSRP_{macro}$, where $RSRP_{macro}$ is the received signal strength measured for the cell of macro BS and $RSRP_{pico}$ is the signal strength measured for the cell of pico BS.

Transmit Patterns and Measurement Patterns for eICIC

To facilitate measurements in the extended cell range, for example, where high interference is expected, the standard specifies Almost Blank Subframe (ABS) patterns for eNodeBs and restricted measurement patterns for user equipments. A pattern that may be configured for eICIC is a bit string indicating restricted and unrestricted subframes characterized by a length and periodicity, which are different for FDD and TDD (40 subframes for FDD and 20, 60 or 70 subframes for TDD). Only DL patterns have been specified for interference coordination in 3GPP, although patterns for UL interference coordination are also known.

An ABS pattern is a transmit pattern at a radio node transmitting radio signals. The ABS pattern is also cell-specific and may be different from the restricted measurement patterns signaled to the user equipment. In a general case, ABS comprises a low-power and/or low-transmission activity subframes. ABS patterns may be exchanged between eNodeBs via X2, but these patterns are not signaled to the user equipment, unlike the restricted measurement patterns.

Restricted measurement patterns, for example, "time domain resource restriction patterns", as described in 3GPP TS 36.331, are configured to indicate to the user equipment a subset of subframes for performing measurements. This may typically be done in lower interference conditions, where the interference may be reduced, for example, by means of configuring MBSFN subframes or ABS subframes at interfering eNodeBs, for example, at least in some examples a restricted measurement pattern for a measured cell overlaps, at least partly, with MBSFN subframes or ABS subframes of a strongly interfering cell.

Restricted measurement patterns may, however, be also configured for user equipments with good interference conditions, for example, receiving a measurement pattern may be not necessarily an indication of expected poor signal quality. For example, a measurement pattern may be configured for a user equipment in the cell range expansion zone where typically high interference is expected, but a measurement pattern may also be configured for user equipments located close to the serving base station where the signal quality is typically good which may be for the purpose of enabling higher-rank transmission modes, for example, rank-two transmissions.

Restricted measurement patterns are in general user equipment-specific, although it is known that such patterns may be broadcasted or multicasted. Three patterns are currently specified in the standard to enable restricted measurements. The three patterns are a serving-cell pattern for RLM and RRM measurements, a neighbor-cell pattern for RRM measurements and a serving-cell pattern for CSI measurements.

Transmit patterns and measurement patterns are means for coordinating inter-cell interference in wireless network and improve measurement performance. Alternatively, or in addition to, inter-cell interference coordination techniques and measurement performance may also be improved by using more advanced receiver techniques, for example, interference suppression or interference cancellation techniques.

SUMMARY

Currently, the performance of parallel measurements and/or channel receptions does not take into account the use of an enhanced receiver. By failing to take the enhanced receiver usage into account, a measuring node may be requested to perform more measurements than the measuring node is capable of carrying out. Therefore, degradation in performance and an unnecessary waste of system resources may happen.

Thus, at least one example object of the example embodiments presented herein may be to provide optimized parallel measurements and/or channel receptions by taking into account the different elements of a wireless network. At least one example advantage of the example embodiments presented herein may be the assurance of a node's awareness of a measuring device's capability with respect to resource usage due to using an enhanced receiver. Another example advantage may be a node's ability to configure measurements and/or channel receptions for a measuring device while accounting for the usage of the enhanced receiver. A further example advantage may be the user equipment's ability to adaptively configure measurements and channels while accounting for a usage of the enhanced receiver. Another example advantage is being having the ability, in a controlled way, to avoid configuring too many measurements and channels for a user equipment which demands excessive usage of the enhanced receiver and may go beyond the user equipment's capability. A further example advantage may be keeping the user equipment complexity (e.g., processing power, power consumption and memory) at a reasonable level, while ensuring the minimum user equipment capability to perform a certain amount of measurements and/or channel receptions involving the enhanced receiver.

Accordingly, some of the example embodiments are directed towards a method, in a radio node, for adapting parallel measurements and/or channel receptions when an enhanced receiver is in use. The method comprises obtaining current information and/or type information. The current information is associated with a total number of current parallel measurements and/or channel receptions being performed. The type information is associated with a type of each parallel measurement and/or channel reception being performed. The method further comprises obtaining interference information, and adapting the number of current parallel measurements and/or channel receptions being performed. The adapting is based on the current information, the type information, and/or the interference information, and at least one enhanced receiver characteristic.

Some of the example embodiments are directed towards a radio node for adapting parallel measurements and/or channel receptions when an enhanced receiver is in use. The radio node comprises processing circuitry configured to obtain current information and/or type information. The current information is associated with a total number of current parallel measurements and/or channel receptions being performed. The type information is associated with a type of each parallel measurement and/or channel reception being performed. The processing circuitry is further configured to obtain interference information, which is associated with interference. The processing circuitry is also configured to adapt the number of current parallel measurements and/or channel receptions being performed. The adapting is based on the current information, the type information, and/or the interference information, and at least one enhanced receiver characteristic.

Some of the example embodiments are directed towards a method, in a network node, for configuring measurements and/or channel receptions for a radio node by accounting for an enhanced receiver utilization. The network node is comprised in a radio network. The method comprises determining a number of parallel measurements and/or channel receptions being performed by the radio node. The method further comprises determining the radio node's capability to perform and/or adapt parallel measurements and/or receive channels. The method further comprises sending, to the radio node or another network node, at least one instruction, based on the determined number of measurements and/or channel receptions and the determined capability, to perform or adapt one or more measurements and/or receive one or more channels.

Some of the example embodiments are directed towards a network node for configuring measurements and/or channel receptions for a radio node by accounting for an enhanced receiver utilization. The network node is comprised in a radio network. The network node comprises processing circuitry configured to determine a number of parallel measurements and/or channel receptions being performed by the radio node.

The processing circuitry is further configured to determine the radio node's capability to perform and/or adapt parallel measurements and/or receive channels. The network node further comprises interface circuitry configured to send, to the radio node or another network node, at least one instruction, based on the determined number of measurements and/or channel receptions and the determined capability, to perform or adapt one or more measurements and/or receive one or more channels.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DEFINITIONS

Figure 1:
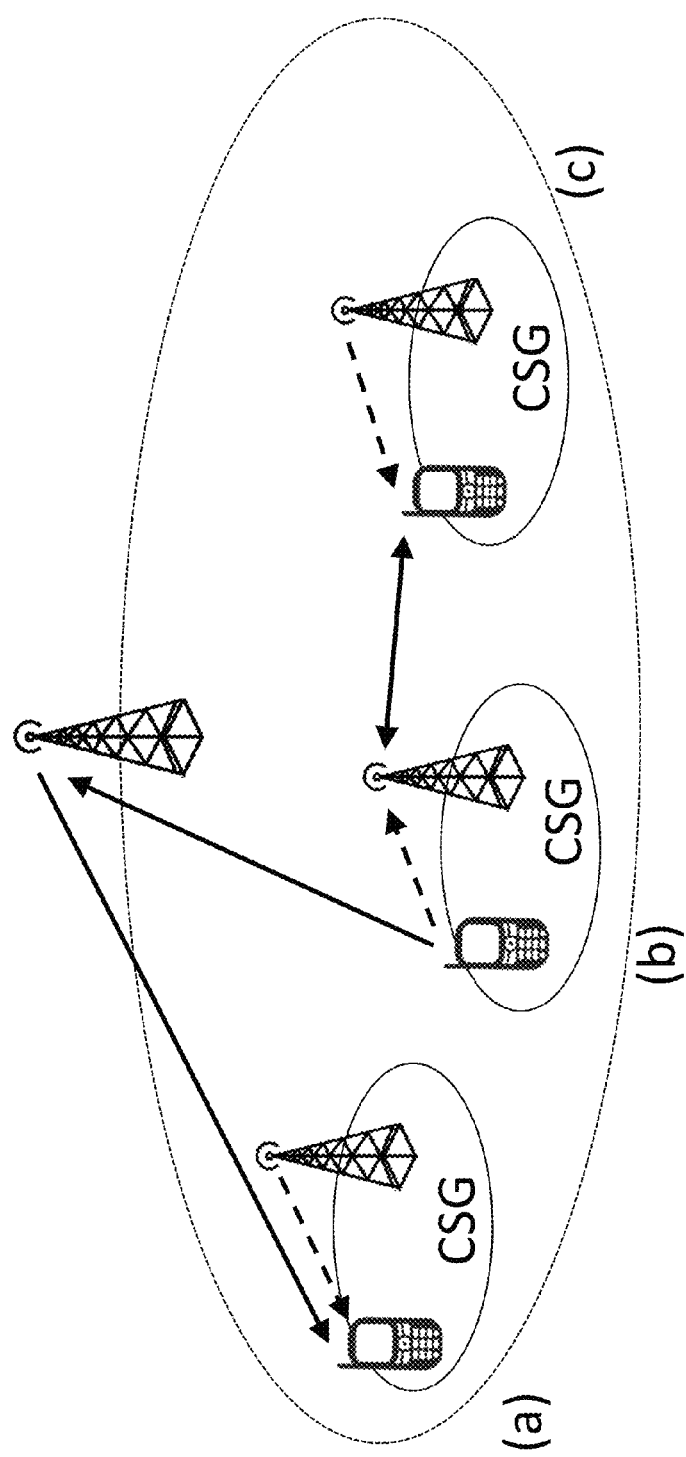
FIG. 1 is an illustrative example of a heterogeneous deployment with CSG cells.
Figure 2:
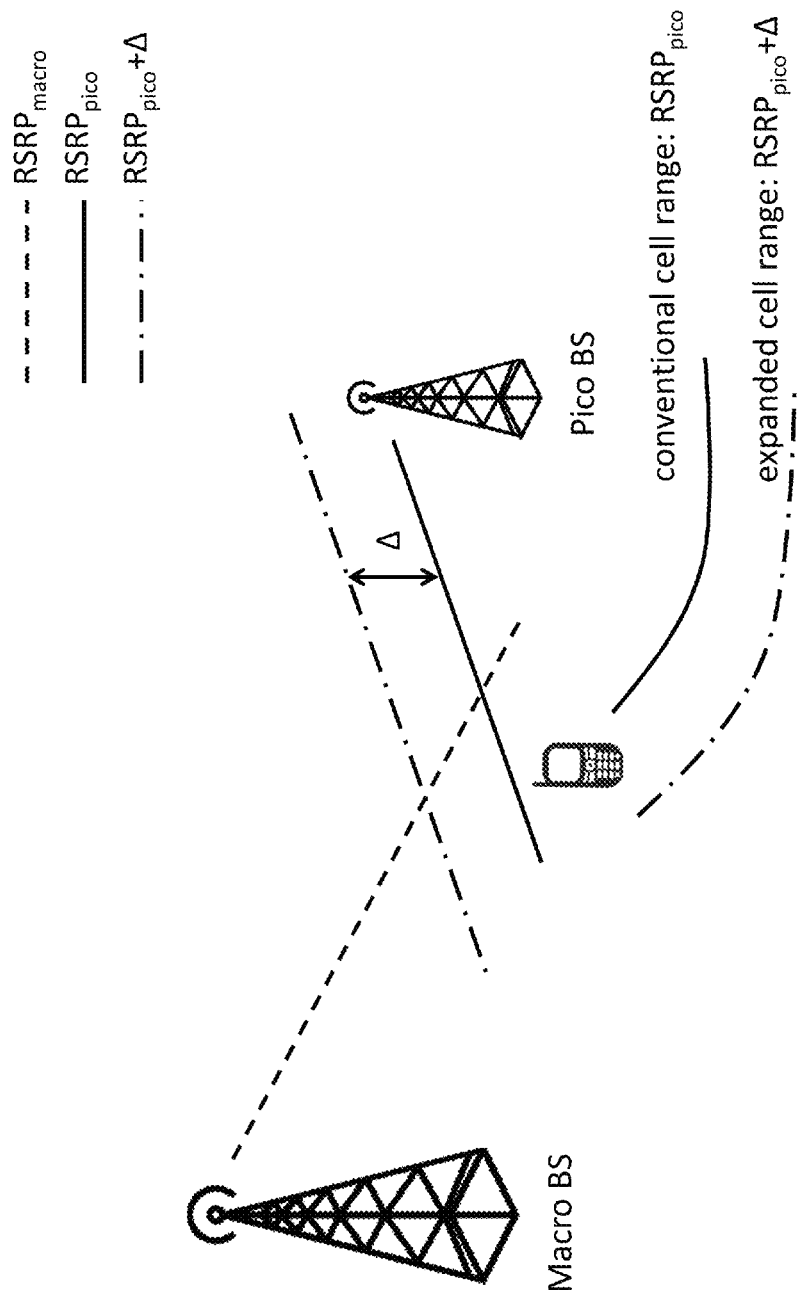
FIG. 2 is an illustrative example of cell range expansion in heterogeneous networks.

3GPP 3rd Generation Partnership Project
ABS Almost Blank Subframe
AECID Adaptive Enhanced Cell Identification
A-GPS Assisted GPS
AoA Angle of Arrival
BCH Broadcast Channel
BS Base Station
CA Carrier Aggregation
CoMP Coordinated Multipoint Transmission
CRS Cell-specific Reference Signal
CSG Closed Subscriber Group
CSI Channel State Information
CQI Channel Quality Indicator
D-BCH Dynamic Broadcast Channel
DL Downlink
DRX Discontinuous Reception
E-CID Enhanced Cell Identification
eICIC enhanced Inter-Cell Interference Coordination
eNodeB evolved Node B
E-SMLC Enhanced Serving Mobile Location Centre
E-UTRAN Evolved Universal Terrestrial Radio Access Network
FDD Frequency Division Duplex
GMLC Gateway Mobile Location Centre
GPRS General Packet Radio Service
GPS Global Positioning System
GSM Global System for Mobile communications
HeNB Home eNode B
HLR Home Location Register
HRPD High Rate Packet Data
HSDPA High-Speed Downlink Packet Access
HSS Home Subscriber Server
ICIC Inter-Cell Interference Coordination
IRC Interference Rejection Combining
LPP LTE Positioning Protocol
LPPa LPP Annex
LTE Long-Term Evolution
LMU Location Measurement Unit
MBSFN Multicast-Broadcast Single Frequency Network
MDT Minimization of Drive Test
MIB Master Information Block
MME Mobility Management Entity
MMSE Minimum Mean Square Error
MSC Mobile Switching Centre
OTDOA Observed Time Difference Of Arrival
PBCH Physical Broadcast Channel
PCell Primary cell
PCFICH Physical Control Format Indicator Channel
PCH Paging Channel
PDCCH Physical Downlink Control Channel
PDSCH Physical Downlink Shared Channel
PDU Protocol Data Unit
PGW Packet Data Network Gateway
PHICH Physical Hybrid ARQ Indicator Channel
PMCH Physical Multicast Channel
PMI Precoding Matrix Indicator
RAT Radio Access Type
RB Resource Block
RI Rank Indicator
RLM Radio Link Monitoring
RRC Radio Resource Control
RRM Radio Resource Management
RS Reference Signal
RSRP Reference Signal Received Power
RSRQ Reference Signal Received Quality
RSTD Reference Signal Time Difference
RTT Round-Trip Time
Rx Receive
SCell Secondary cell
SGSN Serving GPRS Support Node
SI System Information
SIB System Information Block
SIC Successive Interference Cancellation
SGW Serving Gateway
SLP Secure User Plane Location Platform
SON Self-Optimizing/Organizing Network
TA Timing Advance
TDD Time Division Duplex
TDOA Time Difference of Arrival
ToA Time of Arrival
Tx Transmit
UE User Equipment
UL Uplink
UMTS Universal Mobile Telecommunications System
UTRAN Universal Terrestrial Radio Access Network
VMSC Visited Mobile Switching Centre

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Overview of the Example Embodiments

In order to provide a better explanation of the example embodiments presented herein, a problem will first be identified and discussed. 3GPP TS 36.133 specifies requirements on user equipment capabilities for support of event triggering and reporting criteria. The current requirements are primarily defined for the mobility measurements. The requirements comprise a set of reporting criteria categories, the number of reporting criteria per category that user equipment shall be able to support in parallel, and the maximum total number of reporting criteria. The current set of reporting criteria comprises three measurement categories used for mobility: intra-frequency, inter-frequency and inter-RAT measurements.

For the intra-frequency category, measurements for up to 9 E-UTRAN intra-frequency cells may be configured in parallel. For the inter-frequency category, measurements of up to 7 E-UTRAN inter-frequency cells may be configured in parallel. And for inter-RAT, up to 5 parallel measurements per supported RAT are supported. The maximum total number of reporting criteria is currently 30. This means depending upon the user equipment capability, for example, inter-RAT capabilities, the eNodeB may configure the user equipment to perform up to 30 measurements in parallel. As long as the measurement configuration does not exceed the reporting criteria requirements above, the user equipment is required to meet the relevant performance requirements, for example, measurement reporting delay, measurement time, measurement accuracy of the configured measurements, etc.

TABLE 1

Requirements for reporting criteria per measurement category

| Measurement category | $E_{cat}$ | Note |
| --- | --- | --- |
| Intra-frequency | 9 | E-UTRA intra-frequency cells |
| Intra-frequency UE Rx-Tx time difference | 2 | Intra-frequency UE Rx-Tx time difference measurements reported to E-UTRAN via RRC and to positioning server via LPP. Applies for UE supporting both LPP and UE Rx-Tx time difference measurement. |
| Intra-frequency RSTD | 1 | Intra-frequency RSTD measurement reporting for UE supporting OTDOA; 1 report capable of minimum 16 cell measurements for the intra-frequency |
| Inter-frequency | 7 | E-UTRA inter-frequency cells |
| Inter-frequency RSTD | 1 | Inter-frequency RSTD measurement reporting for UE supporting OTDOA; 1 report capable of minimum 16 cell measurements for at least one inter-frequency |
| Inter-RAT (E-UTRAN FDD or TDD, UTRAN FDD, UTRAN TDD, GSM, cdma2000 1 x RTT and HRPD) | 5 | Only applicable for UE with this (inter-RAT) capability. This requirement ($E_{cat} = 5$) is per supported RAT. |

Note:
When the UE is configured with SCell carrier frequencies, $E_{cat}$ for Intra-frequency is applied per serving frequency.

As shown in Table 1, "Intra-frequency", "Inter-frequency" and "Inter-RAT" cover mainly mobility measurements, whilst the corresponding intra- and inter-frequency user equipment Rx-Tx and RSTD measurements are positioning measurements.

The parallel measurement requirements, as described above, do not take into account whether any interference mitigation technique is applied for at least some of the measurements performed in parallel, where the measurements may be, for example, intra-frequency measurements, inter-frequency measurements, inter-RAT measurements, or measurements with carrier aggregation. There are currently no requirements or rules related to the number of parallel measurements at least one of which assumes the use of, involves or requires enhanced receiver techniques.

Furthermore, there are no signaling means to indicate to other nodes (e.g., an eNodeB, home eNodeB, positioning node, or MDT node) the user equipment ability, or capability, to perform a certain number of parallel measurements while using, for example, at least one or more of the enhanced receiver techniques.

Without defining such requirements, rules or signaling, the measuring node (e.g., a user equipment, wireless device or a radio node in general) may be requested to perform more measurements than the measuring node is capable to carry out in parallel, which may degrade performance but also may require prioritization of the measurements while accounting for the use of the enhanced receiver. Such methods are also covered by the example embodiments presented herein.

Some of the example embodiments presented herein may comprise methods in user equipment of adapting the parallel measurements and/or control channel receptions, for example, common, user equipment specific, broadcast, multicast, etc., when using an enhanced receiver.

Some of the example embodiments may comprise adaptation of parallel measurements and/or channel receptions which may be performed based on one or more characteristics associated with the enhanced receiver, radio conditions, activity state, etc.

Some of the example embodiments may comprise the adaptation being based on pre-defined rules/requirements, which may be configured by the network node.

Some of the example embodiments may comprise methods in user equipment for signaling a user equipment capability of adapting the parallel measurements and/or control channels when using an enhanced receiver to the network node.

Some of the example embodiments may comprise methods in network node of taking into account the user equipment capability and/or pre-defined requirements related to adapting the parallel measurements and/or control channels when configuring the parallel reporting criteria and measurements/channels when the user equipment uses the enhanced receiver.

The example embodiments will be presented as follows. First, an overview of a radio network, in which the example embodiments may be utilized, is provided under the subheading 'Radio Network Overview'. Thereafter, examples of how the parallel measurements and/or channel receptions when an enhanced receiver is in use may be adapted are provided under the subheading 'Interference Mitigation/Cancellation Techniques and Parallel Measurements'. Under the subheading 'Signaling Enhancements', examples of different types of information which may be signaled to and from various nodes in the network, to assist in the adaption, is provided.

Thereafter, specific examples for providing instructions or configurations for parallel measurements and/or channel receptions during the use of an enhanced receiver are provided under the subheading 'Example Methods in a Network Node for Configuration of Parallel Measurements and/or Channels when an Enhanced Receiver is used'. Specific examples for providing adaptation of parallel measurements and/or channel receptions when an enhanced receiver is in use are provided under the subheading 'Example Methods in a Measuring Node for Adapting Parallel Measurements and Channel Receptions when the Enhanced Receiver is used'. Finally, example node configurations and example node operations are provided under the subheadings "Example Node Configuration" and "Example Node Operations", respectively.

Radio Network Overview

Figure 3:
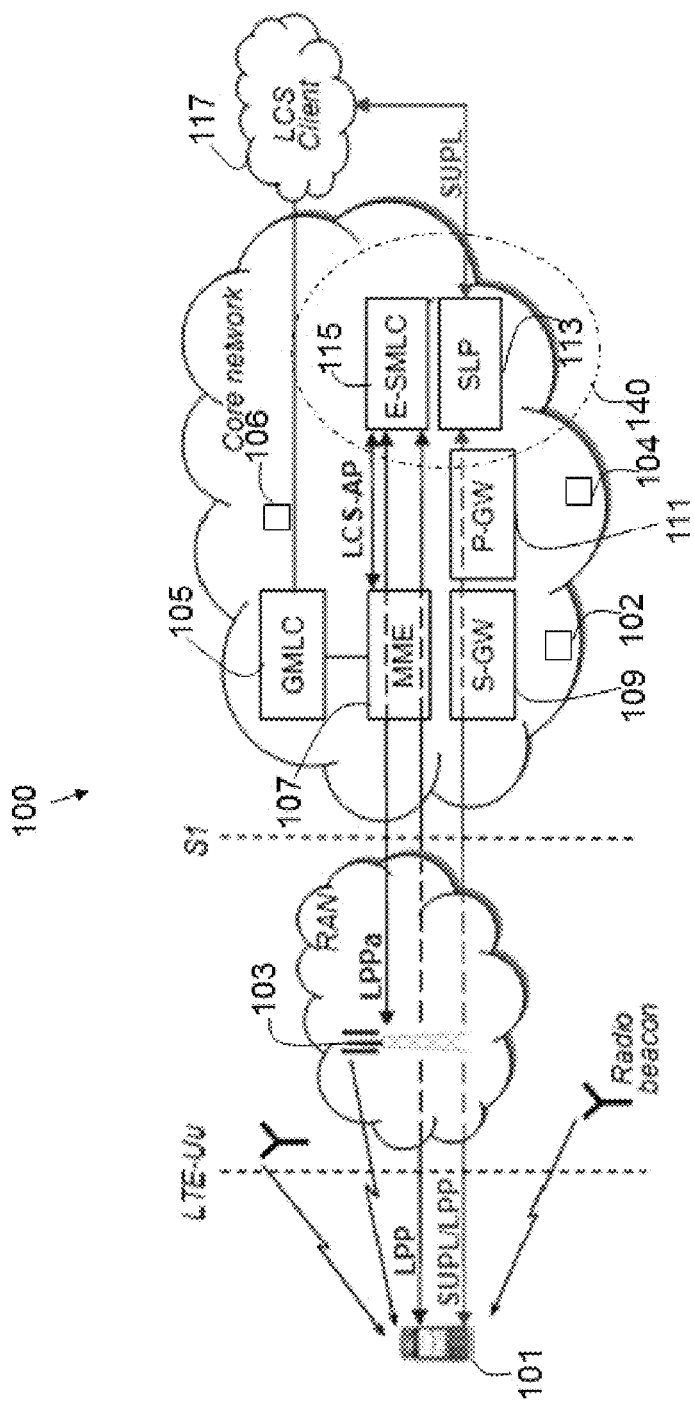
FIG. 3 is an illustrative example of a wireless radio network.

FIG. 3 illustrates positioning architecture in an LTE system which features the positioning node 140. The positioning architecture may comprise the user equipment 101 which may be configured to perform positioning measurements. The user equipment 101 may be in communication with a base station 103 (e.g., base station 103A or 103B). The base station 103 may be in communication with a core network comprising a Serving Gateway (SGW) 109, a Packet Data Network Gateway (PGW) 111 and a Mobility Management Entity (MME) 107. The base station 103 may also be in communication with a Location Measurement Unit (LMU) 102 which may assist in preforming measurements. The core network may also comprise a number of positioning nodes, for example, a Gateway Mobile Location Centre (GMLC) 105, an Enhanced Serving Mobile Location Centre (E-SMLC) 115 and/or a Secure User Plane Location Platform (SLP) 113. SLP 113 may comprise two components, SPC 113b and SLC 113a, which may also reside in different nodes. According to some of the example embodiments, SPC 113b has a proprietary interface with E-SMLC 119, and Llp interface with SLC 113a, and the SLC part of SLP 113 communicates with P-GW (Packet Data Network Gateway) and External LCS Client.

The GMLC 105 may be used to request routing information from the Home Location register (HLR) or Home Subscriber Server (HSS). The GMLC 105 may also be used to positioning requests to the Visited Mobile Switching Centre (VMSC), Serving GPRS Support Node (SGSN) or Mobile Switching Centre (MSC) Server and receive final location estimates from the corresponding entity. The E-SMLC 115 may communicate with the user equipment 101 for location services and assistance data delivery using an LPP protocol. The E-SMLC 115 may also communication with the base station 103 of assistance data purposes using an LPPa protocol. The SLP 113 may be responsible for coordination and administrative functions to provide location services. The SLP 113 may also be responsible for positioning functions. The SLP 113 is a positioning node in the user plane.

It should be appreciated that a radio node may be a measuring node, for example any type base station or a user equipment. It should be appreciated that the terms user equipment, measuring node and base station (or eNodeB) may be interchangeable. Specifically, embodiments (e.g., embodiments directed towards the adaption of parallel measurements and/or channel receptions) which are described solely with a user equipment may also be applied to a measuring node or base station and vice versa.

It should further be appreciated that herein a network node may refer to any form of base station or positioning node. A position node may further be a SLP or E-SMLC. It should be appreciated that the terms base station (or eNodeB) and positioning node may be interchangeable. Specifically, embodiments (e.g., embodiments directed towards providing instructions or configurations for parallel measurements and/or channel receptions) which are described solely with a base station may also be applied to a positioning node and vice versa.

Interference Mitigation/Cancellation Techniques and Parallel Measurements

The enhanced receiver techniques addressed in the example embodiments presented herein may be applied to any physical signal (e.g., physical signals in general, reference signals, cell-specific or user equipment-specific reference signals, synchronization signals, etc.) or channel (e.g., broadcast channel, data channel, control channel, etc.). Some examples of enhanced receiver techniques (in the defined general sense) are interference cancellation, interference rejection combining, and interference suppression. The enhanced receiver techniques may thus apply, for example, to radio measurements and/or channel reception.

According to some of the example embodiments, the measuring node adapts the number of parallel measurements and/or control/common/broadcast/multicast channel reception, which may be performed when enhanced receiver is used for performing at least one measurement and/or for control/common/broadcast/multicast channel reception. The parallel measurements for user equipment herein refer to the event triggering and reporting criteria, which may belong to one or more measurement categories such as intra-frequency, inter-frequency, carrier aggregation, inter-RAT, positioning measurement categories, etc. Examples of control channels are BCH, PCH, etc. For example, the user equipment may perform only 7 intra-frequency measurements in parallel when it uses enhanced receiver for doing intra-frequency measurements.

The adaptation of parallel measurements and/or control/common/broadcast channel reception performed by the measuring node may also depend upon one or more characteristics of the enhanced receiver.

An example characteristic of the enhanced receiver may be a number of interferers or interfering transmitters or interfering cells, whose interference is fully or partly eliminated by the receiver. Another example characteristic may be a signal level of interferers, for example, received signal strength of interferer. A further example may be type of channels or signals on which enhanced receiver is used, for example, reference signals, synchronization signals, broadcast channel, etc. Another example characteristic of the enhanced receive is number of channels or signals on which enhanced receiver is used. A further example is type of control channel received using advanced receiver, or type or category of measurements, for example, intra-frequency, RSRP, RSRQ, timing measurements, positioning measurements, etc. Yet another example of a characteristic of the enhanced receiver may be the availability and the detail level of the assistance information used by the enhanced receiver, as well as how much the enhanced receiver depends on the assistance information provided by the network (the assistance data may. For example, the configuration of interfering signals, related cell information, etc. For example, if the number of interferers is 1 then the user equipment may perform up to 7 intra-frequency measurements in parallel. But if the number of interferers is increased to 2 then the user equipment may perform up to 6 or 5 intra-frequency measurements in parallel.

The adaptation ability may also be associated with a specific activity state and may depend on the state, e.g., a DRX state and non-DRX state, or an IDLE mode or CONNECTED mode. For example, in a low-activity state the adaptation ability may be lower compared to a higher activity state. The lower adaptation may mean a smaller difference with and without accounting for the enhanced receiver in a specific state (e.g., IDLE or DRX), compared to another state (e.g., CONNECTED or non-DRX, respectively), which may occur because the user equipment has already a too limited amount of measurements in this state so that limiting it even further may harm the performance. It should also be appreciated that the measurement capability of different user equipments may be different with respect to the use of the enhanced receiver. According to some of the example embodiments, this difference may be provided by the presence of low-cost devices.

The adaptation may also be associated with the radio characteristics. Non-limiting examples of radio characteristics are a type of radio environment such as indoor, urban, rural, a level of signal dispersion, etc., and/or a user speed. For example, in a highly dispersive channel such as in typical urban environment, the user equipment may be able to perform fewer measurements in parallel since more processing may be required.

According to some of the example embodiments, the number of measurements and/or control/common/broadcast channel receptions that may be performed in parallel is less if the measuring node applies the enhanced receiver for at least N (N≥0) measurements and at least M (M≥0) channel receptions (M+N>0), compared to when no enhanced receiver technique is applied to any of the K (K≥0) measurements and L (L≥0) channel receptions that are performed in parallel without the enhanced receiver. It should be appreciated that the notation introduced herein (e.g., N, M, K, and L) may be applied to any of the example embodiments presented.

According to some of the example embodiments, the number of measurements and/or channel receptions, X and Y respectively, that may be performed in parallel when the enhanced receiver is used, is equal the total number of measurements K and L, respectively, for example, the same as without the enhanced receiver, if the number of measurements N and/or number of channel receptions M for which the enhanced receiver is used does not exceed corresponding thresholds n and m or the aggregate threshold p (i.e., N≤n, M≤m or N+M≤p).

According to some of the example embodiments, the number of measurements and/or channel receptions, X and Y, that may be performed in parallel when the enhanced receiver is used depends on the number of signals to which the enhanced receiver technique is applied, for example, the number of cancelled or suppressed signals, denoted by R and S for measurements and channel receptions, respectively. A cancelled or suppressed signal may comprise an interfering signal from a neighboring cell or device. The cancelled/suppressed signal may or may not be the same for more than one measurement out of N measurements for which the enhanced receiver is used. The cancelled/suppressed signal may or may not be the same for more than one channel reception out of M channel receptions for which the enhanced receiver is used.

According to some of the example embodiments, if the number of cancelled/suppressed signals does not exceed corresponding thresholds r and s (i.e., R≤r, S≤s), the maximum number of measurements and/or channel receptions that can be performed in parallel when the enhanced receiver is used may be the same as when the enhanced receiver is not used.

According to some of the example embodiments, the adaptation of the number of measurements and/or channel receptions that can be performed in parallel when the enhanced receiver is used on the measurements and/or control channel depends upon the extent to which the enhanced receiver is used for the data channel reception. For example, if the user equipment does not use the enhanced receiver on a data channel, then the user equipment may be able to perform more measurements in parallel and/or receive more control/common/broadcast channels in parallel. The user equipment may not use the enhanced receiver on a data channel due to one or more reasons such as when there is no data reception, the data is sent using a robust transport format, the data comprises low bit rate channel, and/or the interference on the data channel is low (e.g. low system load), etc.

According to some of the example embodiments, the user equipment may receive a certain number of control channels (e.g., 4) in parallel using the enhanced receiver when for receiving data on the PCell and the baseline receiver for receiving data on the SCell. The same user equipment may receive a lower number of control channels (e.g., 2) when the enhanced receiver is used for receiving data on both the PCell and SCell.

According to some of the example embodiments, the total number of measurements that can be performed in parallel when the enhanced receiver is used may be represented by:

$$X=N+R,$$

which may be due to the fact that, for example, to cancel R signals the receiver would have to perform channel estimation for those signals. Similarly, the total number of channel receptions that can be performed in parallel when the enhanced receiver is used may be represented by:

$$Y=M+S.$$

According to some of the example embodiments, N and M may be the minimum number of measurements and channel receptions with the enhanced receiver, respectively, that the user equipment may be capable to perform.

Thus, according to some of the example embodiments, the number of measurements and/or channel receptions that can be performed in parallel when the enhanced receiver is used may be described, for example, by a function:

$$(X,Y)=f(N,M,K,L,R,S),$$

where N is the number of measurements for which the enhanced receiver is applied (K≥N≥0), M is the number of channel receptions for which the enhanced receiver is applied (L≥M≥0, N+M≥1), K is the total number of measurements that may be performed in parallel without using the enhanced receiver during the same period (K≥N), L is the total number of channel receptions that can be performed in parallel without using the enhanced receiver during the same period (L≥M), R is the number of signals cancelled or suppressed by enhanced receiver for measurements, S is the number of signals cancelled or received by enhanced receiver for channel receptions, X is the total number of measurements that may be performed in parallel when the enhanced receiver is used for N measurements and/or M channel receptions (X≤K), Y is the total number of channel receptions that may be performed in parallel when the enhanced receiver is used for N measurements and/or M channel receptions (Y≤L).

One example parameter setting may be: N=1, M=0, K=7, L=0, R=1, S=0, X=6, Y=0. With such a setting the maximum number of parallel measurements may be reduced when the enhanced receiver is used for some measurements or channel receptions.

According to some of the example embodiments, the measurements and/or channel receptions (e.g., related to any of N, M, X, Y) may or may not be limited to a certain set of time-frequency resources, for example, subframes configured with a certain periodicity, or certain time-frequency resources with specific interference conditions, for example, subframes indicated as restricted measurement subframes configured for eICIC.

According to some of the example embodiments, any of parameters X, Y, N, M, R, S, may be defined statically, semi-statically or dynamically, and/or defined as the radio device capability. The parameters may also be defined as reporting criteria, which may be pre-defined or configured, for example, externally by software or autonomously by the device or received from a network node or radio network node. The parameters may also be defined separately for one, a subset, or all of time-frequency resources, for example, per frequency carrier or over a number of frequency carriers, per restricted measurement pattern or in configured positioning subframes. The parameters may also be defined separately for one, a subset, or for all measurements and/or channel reception types, for example, N RRM measurements or SI reading for M cells.

Radio Measurements

According to some of the example embodiments, measurements may comprise, but are not limited to, RRM measurements (e.g., cell identification, signal strength, signal quality), RLM measurements, mobility measurements (e.g., signal strength, signals quality), timing measurements (e.g., RTT, UE Rx-Tx, eNodeB Rx-Tx, Timing Advance, ToA, TDOA, RSTD, one-way propagation delay, etc.), positioning measurements (e.g., measurements for E-CID, AECID, fingerprinting, pattern matching, OTDOA, hybrid or other positioning methods), MDT measurements, channel state estimation measurements (e.g., CSI, CQI, RI, PMI, etc.), and/or direction measurements (e.g., AoA). It should be appreciated that these measurements may be intra-frequency, CA measurements, CoMP measurements, inter-frequency, inter-band, and/or inter-RAT.

Channel Reception

According to some of the example embodiments, the channel reception may comprise receiving control, common, broadcast or multicast channels. Channels may be physical or logical channels.

The control channels may be used for sending user equipment and/or cell specific information to the user equipment to control user equipment radio communication. Common and broadcast/multicast channels are generally sent to a group of user equipments or to all user equipments in a cell. User equipment specific information may be sent via dedicated control channels or by means of using user equipment specific codes and/or time frequency resources.

Some examples of control channels are PCFICH, PHICH, broadcast channels (e.g. PBCH, PDSCH, or D-BCH in LTE) carrying system information (SI), paging channels (e.g. PDCCH, PDSCH, etc. in LTE), etc. The PBCH and PDSCH (i.e. D-BCH) carry MIB and SIBs, respectively.

Signaling Enhancements

Information to be Signaled

According to some of the example embodiments, signaling enchantments may comprise providing information associated with the measuring node's capability to adapt the number of parallel measurements and/or channel receptions when the enhanced receiver is used.

The measuring node's capability to adapt the number of parallel measurements and/or control/common/broadcast/multicast channels when the enhanced receiver is used for performing the measurements and/or receiving the channels may be expressed as a pre-defined rule or it may be signaled by the measuring node to another node (e.g., to another user equipment or another network node). In other words any information associated with the adaptation ability described herein may be signaled by the measuring node to another user equipment or another network node.

For example, a user equipment may signal its capability to the serving radio node and/or to other network nodes (e.g., core network node, positioning node, MME, MDT, coordinating node, etc.). The measuring node capability may also be signaled by the network node to another network node.

According to some of the example embodiments, a few non-limiting examples of another network node may be a serving eNodeB (e.g., a femto BS), a neighboring eNodeB (e.g., a macro BS during a handover), or a positioning node.

According to some of the example embodiments, the capability may be signaled to another user equipment and the other user equipment may also signal it to another user equipment or network node. For example, the information associated with the measuring node's capability to adapt parallel measurements and/or channel reception may comprise the basic ability of the measuring node to adapt the performance of parallel measurements and/or channel receptions when using the enhanced receiver. The capability may further comprise an ability to adapt related parameters, for example, any one or more of: N, M, S, R, X, Y, as described under the subheading 'Interference Mitigation/Cancellation Techniques and Parallel Measurements'.

The capability may further provide information regarding types of the measurement and/or channel(s). The capability information may further comprise associated time-frequency resources, for example, subframes, patterns of time-frequency resources, restricted measurement patterns for eICIC, component carriers, frequencies, etc. The capability may also comprise information related to an enhanced receiver usage, for example, the number of currently configured measurements and/or channel receptions when the enhanced receiver is used and/or for which the enhanced receiver is used.

Nodes and Devices Involved

Any of the information described under the preceding sub-heading may be signaled in a number of ways, according to some of the example embodiments. A non-limited example of such signaling may be from one radio device to another radio device (e.g., the user equipment). Signaling may also be provided from the first radio device to the radio network node (e.g., the eNodeB), from the first radio device to the network node (e.g., a positioning node, SON, etc.), from the radio network node to another radio network node, from the radio network node to the network node, from the radio network node to the second radio device signaling of the information related to the first radio device and/or from the network node to the second radio device signaling of the information related to the first radio device.

The information signaled as described above may be provided by the source node to the target node in a number different ways, according to some of the example embodiments. A non-limiting example of providing such information may be upon receiving an explicit request from the target node, for example, the eNodeB requesting the user equipment to send its capability. A further example may be upon receiving an explicit request from another node, for example, the eNodeB requesting the user equipment to send its capability to the positioning node or one eNodeB requesting the user equipment to send its capability to another eNodeB.

A further example may be without receiving an explicit request from a node, for example, without the eNodeB requesting the user equipment to send its capability. In this case the capability may be sent at a pre-defined occasion such as an initial setup, after a cell change, when an interference level changes beyond a certain level, when accessing a node, and/or when setting up a service such as a positioning session and/or configuring positioning measurements, etc.

A further example may be in response to a triggering condition. An example of the triggering condition may be based on a comparison of a signal strength level or a signal quality level to a certain threshold. For example, a triggering condition may occur when the serving cell quality drops below a threshold or when the number of currently performed measurements exceeds a threshold. Other triggering condition examples are a cell change event, a handover event, connection and/or session establishment, etc.

Example Methods in a Network Node for Configuration of Parallel Measurements and/or Channels when an Enhanced Receiver is Used Measurements and/or channel receptions may be requested from the measuring node by any number of different nodes, which may not be aware of the each other's decision or configuration. According to some of the example embodiments, it is assured that the number of configured/requested measurements and/or channel receptions with the enhanced receiver, or the number of measurements and/or channel receptions performed when the enhanced receiver is used, does not exceed the measuring node's capability related to the enhanced receiver, as described under the subheadings 'Interference Mitigation/Cancellation Techniques and Parallel Measurements' and 'Signaling Enhancements'.

According to some of the example embodiments, the first node, for example, a radio node or a network node, may determine any number of factors or criteria in configuring measurements or channels when the enhanced receiver is in use. Non-limiting examples of such criteria may be currently configured reporting criteria in total, and/or currently configured reporting criteria for which the enhanced receiver is used (also likely to be used or may need to be used), for example, due to an expected low signal quality. Further examples may comprise whether the enhanced receiver is used, for example, based on the measuring node's capability or from other information. Another example may be measurement types for which the enhanced receiver is currently used. It should be appreciated that the aforementioned information may be obtained autonomously, for example, and/or by explicit signaling from another node or the measuring node, as described under subheading 'Nodes and Devices Involved'.

Based on the obtained information (with or without an explicit request) and, for example, the enhanced receiver related capability information (as described under the subheading 'Information to be Signaled'), the radio node may configure/schedule/request the measuring node to perform measurements and/or channel receptions.

According to some of the example embodiments, when the number of measurements and channel receptions exceeds a certain threshold, approaches the measuring device capability, or exceeds the measuring device capability, the network node may prioritize some of the measurements and/or channel receptions. Furthermore, prioritizing may also be provided by exploiting the knowledge about the user equipment's ability to adapt measurements and channel receptions when using the enhanced receiver. In such prioritization, the network node may also differentiate between the measurements and channel receptions that require, or are likely to require, a use of the enhanced receiver and the measurements and channel receptions that may be performed without the enhanced receiver, for example, the performance may degrade but would still meet a performance requirement or would not impact the performance of other measurements and/or channels. For example, cell search using the enhanced receiver may be prioritized over paging channel reading.

Example Methods in a Measuring Node for Adapting Parallel Measurements and Channel Receptions when the Enhanced Receiver is Used According to some of the example embodiments, when the total number of configured parallel measurement criteria exceeds the limit, for example any form of a pre-defined requirement, and the user equipment, or measuring node in general, uses the enhanced receiver for at least some measurements and/or channel receptions, the user equipment may adapt the number of parallel measurements to perform and/or channels to receive.

According to some of the example embodiments, the adaptation may be based purely on a pre-defined rule, which may be realized by set of pre-defined requirements. In this case the user equipment may adapt the number as well as specific measurements and/or channel receptions according to the pre-defined requirements.

According to some of the example embodiments, the adaptation may be done autonomously by the user equipment but within the limit defined by a pre-defined rule, which may also be realized by a set of pre-defined requirements. In this case, the user equipment may adapt the number of parallel measurements and/or channel receptions according to the limit defined by the pre-defined requirement. However the user equipment may itself decide which of the measurements should be prioritized or performed and which should not be performed. Thus, in some instances, the user equipment may have to stop the reporting of another, for example, lower priority, measurement or stop the reading of a lower priority channel in favor of a measurement/channel with a higher priority.

For example, the user equipment may determine which of the measurements and/or channel receptions are to be performed when the total number of configured/requested measurements and/or channel receptions is larger than X or Y, respectively. As another example, the user equipment may make a determination when the number of configured/requested measurements and/or channel receptions with the enhanced receiver exceeds N or M, respectively, or the number of measurements and/or channel receptions for which the enhanced receiver may be performed, and those for which the enhanced receiver is to be used should not exceed N, M, S or R.

According to some of the example embodiments, the user equipment may use a prioritization approach to determine which measurements to perform and/or which channels to receive, while accounting for its ability to perform parallel measurements and/or channel receptions when the enhanced receiver is used for at least some of them. In one example, the user equipment may choose not to use the enhanced receiver if it may perform the measurement without the enhanced receiver (perhaps with lower quality) and at the same time also perform another measurement which it would not be able to perform if the enhanced receiver would be used for the first measurement.

It should be appreciated that the autonomous decision in the user equipment may be based on a pre-defined rule. A non-limiting example of such a pre-defined rule may be that a particular type of measurement and/or channel receptions shall always be performed or shall be performed with the enhanced receiver, or has a higher priority, where the type may be associated, for example, with a purpose (e.g., RRM, mobility, positioning, emergency applications, etc.) or frequency (e.g., intra-frequency, inter-frequency, CA, or inter-RAT).

Another non-limiting example of a pre-defined rule may be measurements and/or channel receptions in a specific environment or specific cells shall be performed with or without the enhanced receiver, for example, in a proximity of an interfering radio node or another wireless device or under coverage of a CSG cell. A further example of a pre-defined rule may be measurements and/or channel receptions shall be performed with or without the enhanced receiver when a list of cells is provided. Another example of the pre-defined rule may be measurements and/or channel receptions in specific interference conditions shall be performed with or without the enhanced receiver, for example, when a condition based on thresholds for the received signal strength or quality of one or more cells holds or when the user equipment is in the cell range expansion zone. A further example of the pre-defined rule may be measurements and/or channel receptions shall be performed with or without the enhanced receiver in specific time-frequency resources, for example, when a restricted measurement pattern is provided.

Below are non-limiting example steps which may be taken by the user equipment, according to some of the example embodiments.

Step 1: Obtain the current number and types of measurements and channel receptions performed in parallel.

Step 2: Determine the set of measurements and/or channel receptions for which the enhanced receiver is currently used.

Step 3: (Optional) Determine the set of measurements and/or channel receptions for which the enhanced receiver may not be used, but the minimum required quality is still likely to be achieved.

Step 4: (Optional) Prioritize measurements and/or channel receptions with respect to their importance and the 'cost' of usage of the enhanced receiver for each of them (e.g., the estimation of one channel estimation may be reused by the enhanced receiver for improving performance of more than one measurements and thus may be less 'costly' as if each measurement would require separate channel estimation for the signal to be cancelled).

Step 5: Adapt the number of current measurements and/or channel receptions based on the user equipment's capability to perform parallel measurements and/or channel receptions with enhanced receiver. Such adaption may comprise, for example, reducing a usage of the enhanced receiver and increasing the total number of measurements, choosing to not perform at least one measurement and/or channel reception that requires use of the enhanced receiver, and/or reducing the intensity of the enhanced receiver being used, for example, not cancelling more than one interferer.

Example of Accounting with Respect to the Enhanced Receiver

According to some of the example embodiments, reporting criteria may be configured according to some of the examples provided in Table 2 below:

TABLE 2

Example reporting criteria accounting for the enhanced receiver

| Measurement category | $E_{cat}$ | Note |
|---|---|---|
| Intra-frequency | 9 | E-UTRA intra-frequency cells |
| Intra-frequency UE Rx-Tx time difference | 2 | Intra-frequency UE Rx-Tx time difference measurements reported to E-UTRAN via RRC and to positioning server via LPP. Applies for UE supporting both LPP and UE Rx-Tx time difference measurement. |
| Intra-frequency RSTD | 1 | Intra-frequency RSTD measurement reporting for UE supporting OTDOA; 1 report capable of minimum 16 cell measurements for the intra-frequency |
| Inter-frequency | 7 | E-UTRA inter-frequency cells |
| Inter-frequency RSTD | 1 | Inter-frequency RSTD measurement reporting for UE supporting OTDOA; 1 report capable of minimum 16 cell measurements for at least one inter-frequency |

TABLE 2-continued

Example reporting criteria accounting for the enhanced receiver

| Measurement category | $E_{cat}$ | Note |
|---|---|---|
| Inter-RAT (E-UTRAN FDD or TDD, UTRAN FDD, UTRAN TDD, GSM, cdma2000 1 x RTT and HRPD) | 5 | Only applicable for UE with this (inter-RAT) capability. This requirement ($E_{cat}$ = 5) is per supported RAT. |

Note 1: When the user equipment is configured with SCell carrier frequencies, $E_{cat}$ for Intra-frequency is applied per serving frequency.
Example Note 2: When the user equipment performs measurements/receptions with the enhanced receiver, the number of measurements may also comprise the minimum number of aggressor interferers the receiver is capable to deal with. or:
Another example Note 2: When the measurements require the use of the enhanced receiver, the number of parallel measurements may be lower.

Applicability the Example Embodiments to Measurement Requirements and Channel Performance Requirements According to some of the example embodiments, it is noted that if the amount of requested or configured measurements and/or channel receptions when using the enhanced receiver is within the measuring node's capability, the measuring node may be expected to meet certain performance requirements, for example, report the measurements within a certain time and comply with a certain accuracy level.

Otherwise, if the amount of requested or configured measurements and/or channel receptions when using the enhanced receiver is beyond the measuring node's capability, the measurement time or channel reading time for at least one measurement or channel may be longer and/or the accuracy may be degraded.

Some of the example embodiments may also apply to cell identification. Thus, the number of cell identifications performed by the measuring node may be smaller when the user equipment uses the enhanced receiver than if the user equipment would not use the enhanced receiver to deal with the interference. In other words, the required minimum number of reported identified cells may be smaller if the enhanced receiver is used for the cell identifications or other measurements and/or channel receptions performed in parallel.

According to some of the example embodiments, it may be assumed that the measuring node is using the enhanced receiver when the measurement and/or channel reception is performed in certain interference conditions, for example, at a signal level below a certain threshold (e.g., the threshold may correspond to when the measuring node is capable of performing the same measurement and/or channel reception without using the enhanced receiver and meet the corresponding requirement).

Methods of Configuring Parallel Measurements and/or Channel Receptions Accounting for Usage of the Enhanced Receiver and Power Consumption or Battery Energy Level According to some of the example embodiments, usage of the enhanced receiver is associated with the configuring node and/or measuring node with additional power consumption, for example, more intensive usage of the enhanced receiver is likely to result in higher power consumption and faster battery energy consumption. With this, the adaption described in this section enables measurement and channel configurations that are energy efficient. According to some of the example embodiments, this may be achieved by the methods described in any of the previous sections combined with the power and energy consumption aspect described herein. This also applies to prioritization approaches in the measuring or configuring nodes with respect to using the enhanced receiver while accounting for power/energy.

Any one of the embodiments described until this part may further be enhanced with the information about the battery level and adaptation of the measurements configuration and/or channel configuration by the configuring node or measuring node. Such enhancement may be based on, for example, the measuring device's capability of parallel measurements and channel receptions when using the enhanced receiver, a current measurement and channel configuration, a power or battery energy level indication, and/or a power-saving or energy-consumption mode indication.

Example Node Configurations

Figure 4:
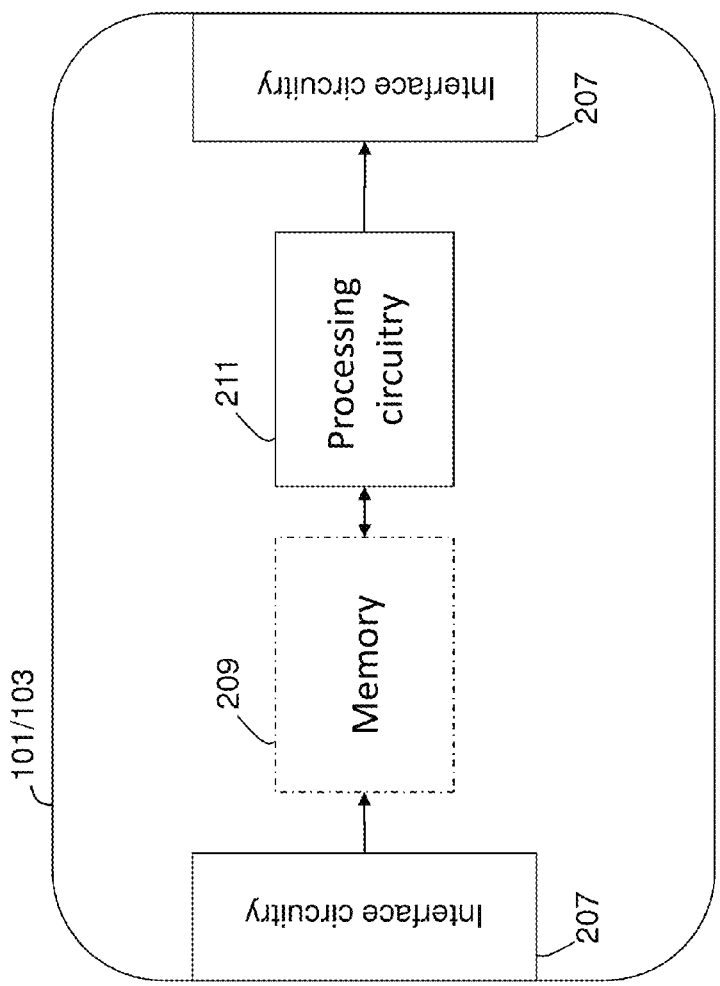
FIG. 4 is an example node configuration of a radio node, according to some of the example embodiments.

FIG. 4 illustrates an example of a radio node 101/103 which may incorporate some of the example embodiments discussed above. According to some of the example embodiments, the radio node may be a measuring node, user equipment 101 or any type of base station 103. As shown in FIG. 4, the radio node 101/103 may comprise interference circuitry 207 configured to receive and transmit any form of communications or control signals within a network. It should be appreciated that the interference circuitry 207 may be comprised as any number of transceiving, receiving, and/or transmitting units or circuitry. It should further be appreciated that the interference circuitry 207 may be in the form of any input/output communications port known in the art. The interference circuitry 207 may comprise RF circuitry and baseband processing circuitry (not shown).

The radio node 101/103 may further comprise at least one memory unit or circuitry 209 that may be in communication with the interference circuitry 207. The memory 209 may be configured to store received or transmitted data and/or executable program instructions. The memory 209 may also be configured to store any form of predefined rules of information related to the example embodiments presented herein. The memory 209 may be any suitable type of computer readable memory and may be of volatile and/or non-volatile type.

The radio node 101/103 may further comprise processing circuitry 211 which may be configured to adapt the parallel measurements and/or channel receptions based on a usage of an enhanced receiver. The processing circuitry 211 may also be configured to provide configuration instructions to the user equipment, in the case where the radio node is a base station 103. The processing circuitry 211 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 5:
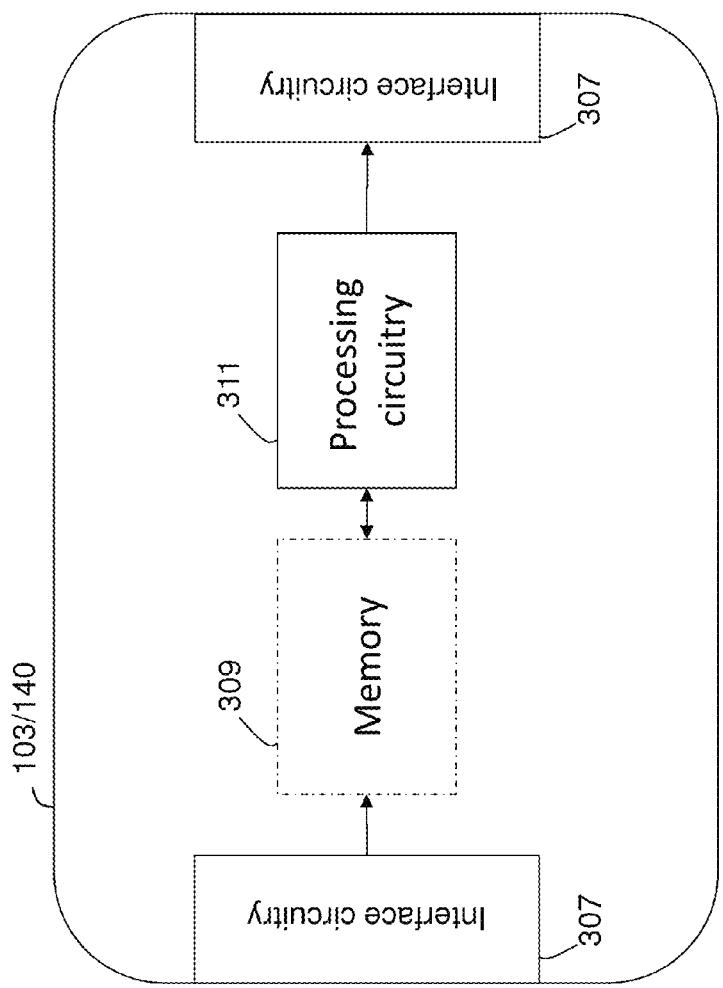
FIG. 5 is an example node configuration of a network node, according to some of the example embodiments.

FIG. 5 illustrates an example of a network node 103/140 which may incorporate some of the example embodiments discussed above. According to some of the example embodiments, the network node may be a base station 103 or a positioning node 140. As shown in FIG. 5, the network node 103/140 may comprise interference circuitry 307 configured to receive and transmit any form of communications or control signals within a network. It should be appreciated that the interference circuitry 307 may be comprised as any number of transceiving, receiving, and/or transmitting units or circuitry. It should further be appreciated that the interference circuitry 307 may be in the form of any input/output communications port known in the art. The interference circuitry 307 may comprise RF circuitry and baseband processing circuitry (not shown).

The network node 103/140 may further comprise at least one memory unit or circuitry 309 that may be in communication with the interference circuitry 307. The memory 309 may be configured to store received or transmitted data and/or executable program instructions. The memory 309 may also be configured to store any form of predefined rules of information related to the example embodiments presented herein. The memory 309 may be any suitable type of computer readable memory and may be of volatile and/or non-volatile type.

The network node 103/140 may further comprise further processing circuitry 311 which may be configured to adapt the parallel measurements and/or channel receptions based on a usage of an enhanced receiver. The processing circuitry 311 may also be configured to provide configuration instructions to the user equipment for providing the adaptation. The processing circuitry 311 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Example Node Operations

Figure 6:
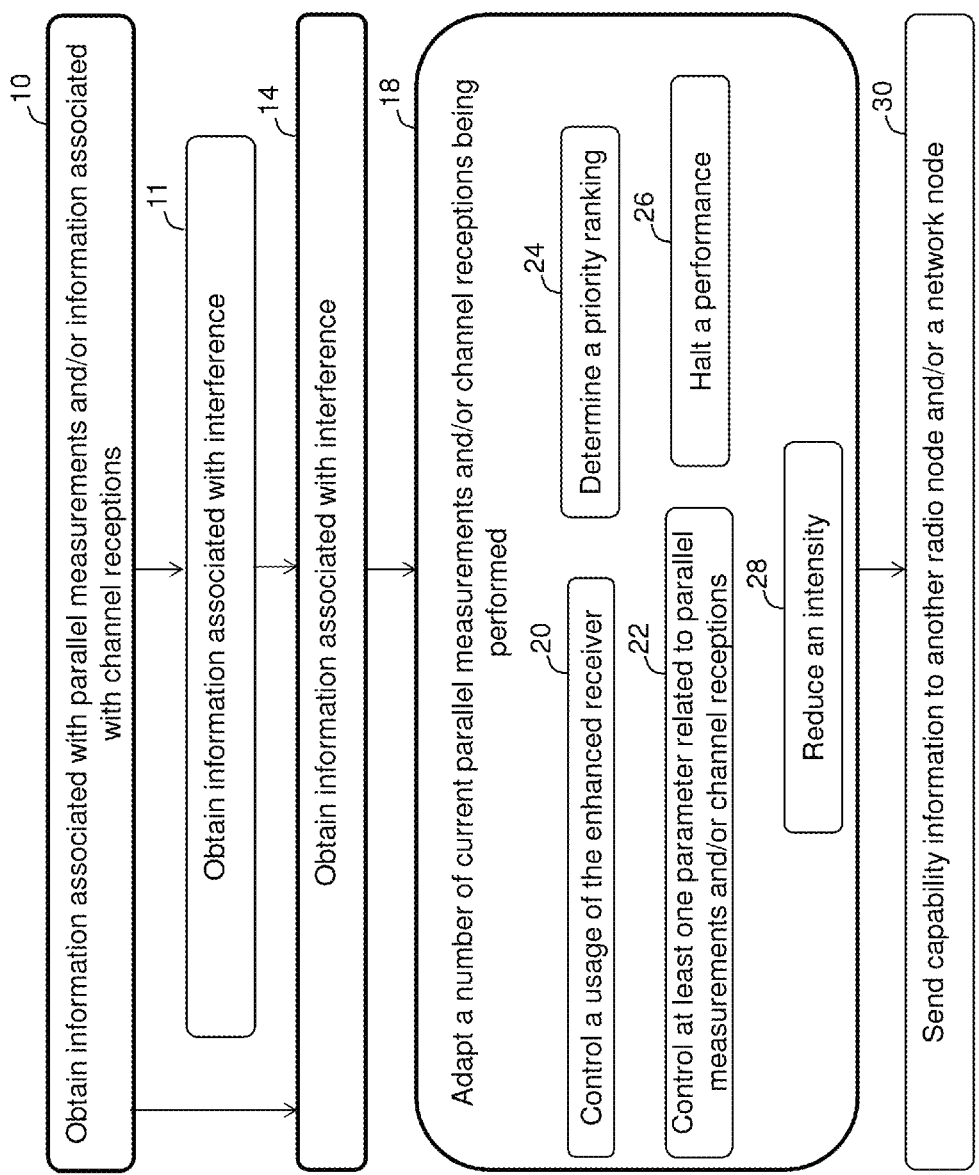
FIG. 6 is a flow diagram depicting example operations of the radio node of FIG. 4, according to some of the example embodiments.

FIG. 6 is a flow diagram depicting example operations which may be taken by the radio node 101/103 of FIG. 4, during the adaption of parallel measurements and/or channel receptions when an enhanced receiver is in use, according to some of the example embodiments.

It should be appreciated that FIG. 6 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Operation 10

The radio node 101/103 is configured to obtain 10 current information and/or type information. The current information is associated with a total number of current parallel measurements and/or channel receptions being performed. The type information is associated with a type of each parallel measurement and/or channel reception being performed. The processing circuitry 211 is configured to obtain the current and/or the type information.

According to some of the example embodiments, the current and/or type information may be obtained from another radio node or network node. According to some of the example embodiments, the current and/or type information may be obtained by the radio node 101/103 itself. Further explanation and examples of the type of information which may be obtained, and how such information may be obtained, is described at least under the subheading 'Signaling Enhancements'.

Operation 14

The radio node 101/103 is further configured to obtain 14 interference information. The processing circuitry 211 is configured to obtain the interference information.

According to some of the example embodiments, the interference information may comprise at least one of a number of interfering radio nodes or interfering cells, time-frequency resources associated with interfering transmissions, received signal strength of at least one interferer, a type of interfering signals or channels, a measurement pattern, or assistance data for interference handling.

According to some of the example embodiments in the interference information may be obtained from another radio node or network node. According to some of the example embodiments, the interference information may be obtained by the radio node 101/103 itself. It should be appreciated that the current, type and interference information may comprise any form of information or parameter discussed herein. Further explanation and examples of the type of information which may be obtained, and how such information may be obtained, is described at least under the subheading 'Signaling Enhancements'.

Operation 18

The radio node 101/103 is further configured to adapt 18 the number of current parallel measurements and/or channel receptions being performed. The adapting is based on the current information, the type information, and/or the interference information, and at least one enhanced receiver characteristic. The processing circuitry 211 is configured to adapt the number of current parallel measurements and/or channel receptions being performed.

According to some of the example embodiments, the at least one enhanced receiver characteristic may comprise any one or more of a number of interferers, a number of interfering transmitters, a number of interfering cells whose interference is fully or partly eliminated by the enhanced receiver, received signal strength of interferes whose interference is fully or partially eliminated by the enhanced receiver, types of channels or signals whose interference is fully or partially eliminated by the enhanced receiver, a number of different types of channels or signals on which the enhanced receiver is sued, an ability to handle high interference without or with assistance data for interference handling, the enhanced receiver's ability to handle the interference by applying interference cancellation, the enhanced receiver's ability to handle the interference by applying interference suppression, and the enhanced receiver's ability to handle the interference by applying interference rejection.

According to some of the example embodiments, the adapting 18 may be further based on at least one of an amount of usage of an enhanced receiver, an amount of power consumption, a measurement pattern and/or a battery energy level.

According to some of the example embodiments, the adapting 18 may be performed autonomously, based on a pre-defined rule, and/or based on adaption instructions received from another radio node or a network node.

According to some of the example embodiments, the adapting may be further based on an activity state of the radio node, a type of radio environment in which the radio node is located and/or a speed of the radio node.

Further explanation and examples of how the adaption may be performed, is described at least under the subheadings 'Interference Mitigation/Cancelation Techniques and Parallel Measurements' and 'Example Methods in a Measuring Node for Adapting Parallel Measurements and Channel Receptions'.

Example Operation 20

According to some of the example embodiments, the adapting 18 may further comprise controlling 20 a usage of the enhanced receiver. The processing circuitry 211 may be configured to control the usage of the enhanced receiver.

Further explanation and examples of how the controlling of a usage may be provided is described at least under the subheadings 'Interference Mitigation/Cancelation Techniques and Parallel Measurements' and 'Example Methods in a Measuring Node for Adapting Parallel Measurements and Channel Receptions'.

Example Operation 22

According to some of the example embodiments, the adapting 18 may further comprising controlling 22 at least one parameter related to the current number of parallel measurements and/or channel receptions. The processing circuitry 211 may be configured to control at least one parameter related to the current number of parallel measurements and/or channel receptions.

Further explanation and examples of how the controlling of the at least one parameter is described at least under the subheadings 'Interference Mitigation/Cancelation Techniques and Parallel Measurements' and 'Example Methods in a Measuring Node for Adapting Parallel Measurements and Channel Receptions'.

Example Operation 24

According to some of the example embodiments, the adapting 18 may further comprise providing 24 a priority ranking of parallel measurements or channel receptions based on a level of interference. The processing circuitry 211 may be configured to provide the priority ranking of parallel measurements or channel receptions based on the level of interference.

Further explanation and examples of how the prioritization may be performed is described at least under the subheadings 'Interference Mitigation/Cancelation Techniques and Parallel Measurements' and 'Example Methods in a Measuring Node for Adapting Parallel Measurements and Channel Receptions'.

Example Operation 26

According to some of the example embodiments, the adapting 18 may further comprising halting 26 a performance of at least one measurement and/or channel reception that requires use of the enhanced receiver. The processing circuitry 211 may be configured to halt the performance of the at least one measurement and/or channel reception that requires use of the enhanced receiver.

Further explanation and examples of how the halting may be performed is described at least under the subheadings 'Interference Mitigation/Cancelation Techniques and Parallel Measurements' and 'Example Methods in a Measuring Node for Adapting Parallel Measurements and Channel Receptions'.

Example Operation 28

According to some of the example embodiments, the adapting 18 may further comprise reducing 28 an intensity of the enhanced receiver when a number of interferes requiring an enhanced receiver for a measurement or channel reception exceeds a threshold. The processing circuitry 211 may be configured to reduce the intensity of the enhanced receiver when the number of interferes requiring the enhanced receiver for a measurement or channel reception exceeds a threshold.

Further explanation and examples of how the reduction may be performed is described at least under the subheadings 'Interference Mitigation/Cancelation Techniques and Parallel Measurements' and 'Example Methods in a Measuring Node for Adapting Parallel Measurements and Channel Receptions'.

Example Operation 30

According to some of the example embodiments, the radio node 101/103 may be further configured to send 30 capability information to another radio node and/or to a network node. The capability information may indicate that the radio node is capable of adapting the number of currently performed parallel measurements and/or channel receptions based on the current information, type information and/or interference information and at least one enhanced receiver characteristic.

The processing circuitry 211 may be configured to send the capability information to another radio node and/or to a network node.

According to some of the example embodiments, the capability information may comprise any one or more of the information associated with interference, a measurement pattern, an ability of the radio node to adapt the number of current parallel measurements and/or channel receptions being performed while using the enhanced receiver for performing the parallel measurements or channel receptions, information associated with the current number of parallel measurements and/or channel receptions, types of parallel measurements and/or channel reception being performed, time-frequency resources associated with the parallel measurements or channel receptions, and/or an ability of the radio node to adapt the number of current parallel measurements and/or channel receptions being performed while using the enhanced receiver for performing the parallel measurements or receiving the channels (adaptively to the enhance receiver usage, power consumption level, and/or battery energy level).

Further explanation and examples of the type of information which may be sent, and how such information may be sent, is described at least under the subheading 'Signaling Enhancements'.

Figure 7:
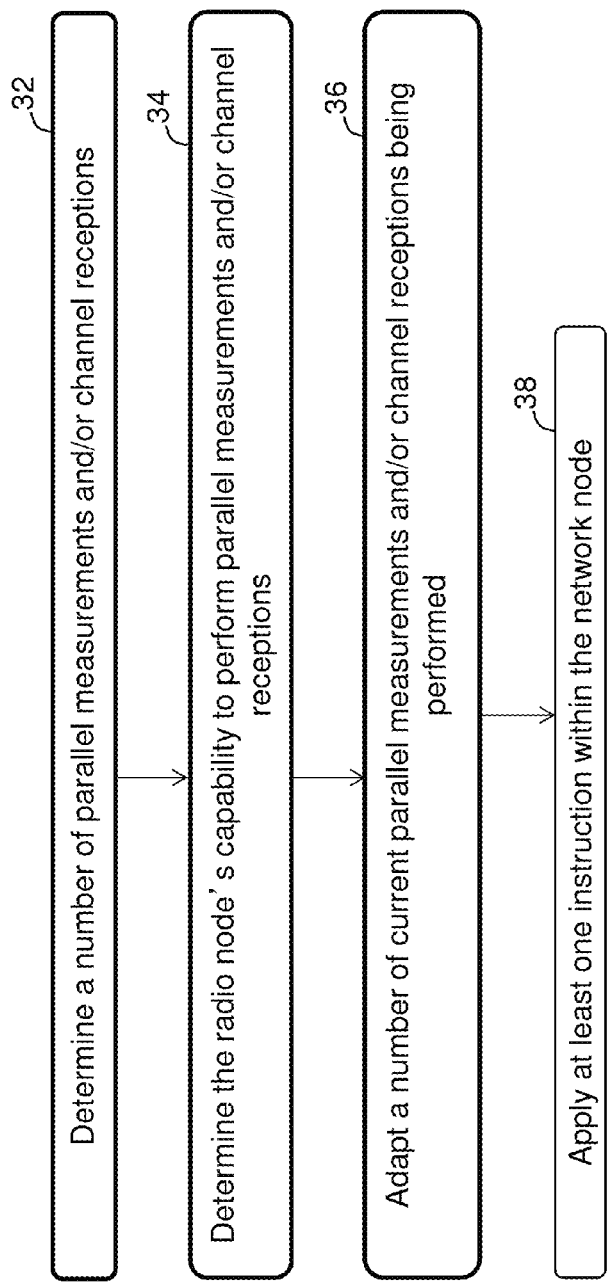
FIG. 7 is a flow diagram depicting example operations of the network node FIG. 5, according to some of the example embodiments.

FIG. 7 is a flow diagram depicting example operations which may be taken by the network node 103/140 of FIG. 5, during the configuration of measurements and/or channel receptions for a radio node by accounting for an enhanced receiver utilization, according to some of the example embodiments.

It should be appreciated that FIG. 7 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Operation 32

The network node 103/140 is configured to determine 32 a number of parallel measurements and/or channel receptions being performed by the radio node 101/103. The processing circuitry 311 is configured to determine the number of parallel measurements and/or channel receptions being performed by the radio node 101/103.

Further explanation and examples of the type of information which may be determined, and how such information may be determined, is described at least under the subheadings 'Interference Mitigation/Cancelation Techniques and Parallel Measurements', 'Signaling Enhancements' and 'Example Methods in a Network Node for Configuration of Measurements and/or Channels when an Enhanced Receiver is in use'.

Operation 34

The network node 103/140 is further configured to determine 34 the radio node's 101/103 capability to perform and/or adapt parallel measurements and/or receive channels. The processing circuitry 311 is configured to determine the radio node's 101/103 capability to perform and/or adapt parallel measurements and/or receive channels.

According to some of the example embodiments, the determining 34 may be based on capability information received from the radio node, another network node, and/or based on a predefined rule.

According to some of the example embodiments, the capability further comprises an ability of the radio node to adapt a number of measurements being performed and/or channel receptions, for example, while the enhanced receiver is in use for performing the parallel measurements or channel receptions. The capability may be based on at least one of information associated with the parallel measurements and/or information associated with channel receptions and at least one enhanced receiver characteristic. The capability may be further based on information associated with a level of interference from at least one interfering radio node and/or associated time-frequency resources.

According to some of the example embodiments, the capability may be further based on a measurement pattern, types of parallel measurements and/or channel reception being performed, and/or time frequency resources associated with the parallel measurements or channel receptions.

According to some of the example embodiments, the capability may further comprise an ability to adaptively enhance receiver usage, a power consumption level, and/or a battery energy level.

Further explanation and examples of the type of information which may be determined, and how such information may be determined, is described at least under the subheadings 'Interference Mitigation/Cancelation Techniques and Parallel Measurements', 'Signaling Enhancements' and 'Example Methods in a Network Node for Configuration of Measurements and/or Channels when an Enhanced Receiver is in use'.

Operation 36

The network node 103/140 is further configured to send 36, to the radio node 101/103 or another network node, at least one instruction. The at least one instruction is based on the determined number of parallel measurements and/or channel receptions and the determined capability. The instruction is directed towards performing or adapting one or more measurements and/or receiving one or more channels. The interface circuitry 307 is configured to send, to the radio node or another network node, the at least one instruction.

According to some of the example embodiments, the one or more measurements, and/or one or more received channels, may be of a same or different type. According to some of the example embodiments, the at least one instruction is further based on a level of interference from at least one interfering radio node or cell and/or at least one characteristic of the enhanced receiver. It should be appreciated that the level of interference may further comprise a number of interference radio nodes or interfering cells whose interference is at least partially eliminated by the enhanced receiver and/or a received signal strength of the at least one interfering radio node.

According to some of the example embodiments, the at least one instruction further comprises at least one reduction instruction for reducing a usage of the enhanced receiver an increasing a current number of parallel measurements being performed, halting at least one measurement and/or channel reception that requires a use of the enhanced receiver, and/or reducing an intensity of the enhanced receive.

According to some of the example embodiments, the at least one instruction may further be based on an activity state of the radio node, a type of radio environment in which the radio node is located, a power level of the radio node, and/or speed of the radio node.

According to some of the example embodiments, the network node 103/140 may be further configured to obtain at least one characteristic of the enhanced receiver. According to some of the example embodiments, the at least one instruction may be further based on the at least one characteristic of the enhanced receiver. According to some of the example embodiments, the at least one characteristic of the enhanced receiver may comprise a type or number of channel or signal utilized by the enhanced receiver, a type of control channel utilized by the enhanced receiver, and/or an availability or detail level of assistance information used by the enhanced receiver.

Further explanation and examples of the type of information which may be sent, and how such information may be sent, is described at least under the subheadings 'Interference Mitigation/Cancelation Techniques and Parallel Measurements', 'Signaling Enhancements' and 'Example Methods in a Network Node for Configuration of Measurements and/or Channels when an Enhanced Receiver is in use'.

Example Operation 38

According to some of the example embodiments, the network node 103/140 may be further configured to apply 38 the at least one instruction, within the network node 103/140, and perform measurements based on the applying 38. The processing circuitry 311 may be configured to apply the at least one instruction, within the network node 103/140, and perform measurements based on the application. Thus, in such an example embodiment, the network may also function as a measuring node.

Further explanation and examples of the application may be performed is described at least under the subheadings 'Interference Mitigation/Cancelation Techniques and Parallel Measurements', 'Example Methods in a Network Node for Configuration of Measurements and/or Channels when an Enhanced Receiver is in use' and 'Example Methods in a Measuring Node for Adapting Parallel Measurements and Channel Receptions when the Enhanced Receiver is in use'.

CONCLUSION

It should be appreciated that the term 'parallel measurements and/or channel receptions' may be interpreted as (1) at least one measurement and at least one other measurement being performed in parallel, (2) at least one channel and at least one other channel being received in parallel, or (3) at least one measurement being performed and at least one channel being received in parallel.

It should further be appreciated that the example embodiments are described herein using non-limiting generalized terms such as 'enhanced receiver' and 'enhanced receiver technique'. The phrases "using an enhanced receiver" herein may be used interchangeably with "using the capability of the enhanced receiver to deal with the interference in an enhanced way" (note that "not using an enhanced receiver" may also mean that the same physical receiver is used but only the enhanced technique is not used to deal with the aggressor interference).

Although the description is mainly given for a user equipment, it should be understood by the skilled in the art that "user equipment" is a non-limiting term comprising any wireless device or radio node equipped with a radio interface allowing for at least receiving radio signals and/or performing measuring signals. A user equipment in its general sense herein is further interchangeably referred to as a radio device. Some examples of such radio device are PDA, laptop, mobile, sensor, fixed relay, mobile relay, a radio network node, a radio base station, a femto base station, a small base station using the terminal-like technology, a low-cost radio device. The radio device may further be capable of operating or performing measurements in one or more frequencies, carrier frequencies, component carriers or frequency bands. The radio devices may or may not use measurement gaps. The radio device may also operate in single- or multi-RAT or multi-standard mode (e.g., an example dual-mode UE may operate with any one or combination of WiFi and LTE).

It should be appreciated herein that the term "measuring node" may comprise a base station, user equipment, or any form of wireless device in general (e.g., relays, eNodeB, HeNB).

A first radio device is receiving and/or measuring signals from a second radio device (i.e., user equipment, radio base station, etc.). The first radio device may be associated with or served by a radio network node (e.g., a radio base station), wherein the radio network node may or may not be the same as the second radio device. Further, a measurement performed by the first radio device may be requested or configured by a network node, wherein the network node may or may not be the same as the radio network node. Some examples of the network node are eNodeB, NodeB, RNC, positioning node, MDT node, SON node, O&M node, etc.

User equipment and radio nodes may perform measurements and are thus examples of a measurement node. A cell may be associated with the radio network node, wherein some examples of radio network nodes are eNodeB, Node B, macro/micro/pico radio base station, home eNodeB, relay, repeater, sensor, radio nodes transmitting physical signals, etc. A radio network node herein may comprise a radio node operating in one or more frequencies, carrier frequencies or frequency bands. It may be a radio node capable of CA. It may also be a single- or muti-RAT or multi-standard node, e.g., using the same or different base band modules for different RATs.

Multiple serving cells are possible with carrier aggregation, so "a serving cell" is in general used throughout the description for CA and non-CA systems. With CA, primary cell (PCell) is one example of a serving cell, and another example is a secondary cell (SCell). A radio node may also be a radio node which does not create own cell, but still transmitting some DL signals or receiving some signals in UL. A subframe may be an LTE subframe or any time interval or time slot, which may be pre-defined.

The term "centralized network management node" or "coordinating node" used herein is a network node, which may also be a radio network node, which coordinates radio resources with one or more radio network nodes and/or user equipments. Some examples of the coordinating node are network monitoring and configuration node, OSS node, O&M, MDT node, SON node, positioning node, a gateway node such as Packet Data Network Gateway (P-GW) or Serving Gateway (S-GW) network node or femto gateway node, a macro node coordinating smaller radio nodes associated with it, etc.

The signaling described in some of the example embodiments is either via direct links or logical links (e.g. via higher layer protocols and/or via one or more network nodes). For example, signaling from a coordinating node may pass another network node, e.g., a radio node. The example embodiments are not limited to LTE, but may apply with any Radio Access Network (RAN), single- or multi-RAT. Some other RAT examples are LTE-Advanced, UMTS, GSM, cdma2000, WiMAX, and WiFi. Embodiments and sections described herein may be considered as independent embodiments or may be considered in any combination with each other to describe non-limiting examples of the embodiments.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or muti-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a radio node, for adapting parallel measurements or channel receptions, or both, when an enhanced receiver is in use, the method comprising:
obtaining current information or type information, or both, said current information being associated with a total number of current parallel measurements or channel receptions being performed, or both, said type information being associated with a type of each parallel measurement or channel reception being performed, or both;
obtaining interference information; and
adapting the number of current parallel measurements or channel receptions being performed, or both, the adapting being based on at least one enhanced receiver characteristic and one or more of the current information, the type information, and the interference information.

2. The method of claim 1, wherein the obtaining further comprises receiving, from another radio node or network node, one or more of the current information, the type information, and the interference information.

3. The method of claim 1, wherein the interference information comprises at least one of a number of interfering radio nodes or interfering cells, time-frequency resources associated with interfering transmissions, received signal strength of at least one interferer, a type of interfering signals or channels, a measurement pattern, or assistance data for interference handling.

4. The method of claim 1, wherein the adapting is further based on at least one of an amount of usage of an enhanced receiver, an amount of power consumption, a measurement pattern, and a battery energy level.

5. The method of claim 1, wherein the adapting further comprises controlling a usage of the enhanced receiver.

6. The method of claim 1, wherein the adapting further comprises controlling at least one parameter related to the current number of parallel measurements or channel receptions being performed, or both.

7. The method of claim 1, wherein the adapting further comprises providing a priority ranking of parallel measurements or channel reception, based on a level of interference.

8. The method of claim 1, wherein the adapting further comprises halting a performance of at least one measurement or channel reception that requires usage of the enhanced receiver.

9. The method of claim 1, wherein the adapting further comprises reducing an intensity of the enhanced receiver when a number of interferers requiring an enhanced receiver for a measurement or channel reception exceeds a threshold.

10. The method of claim 1, wherein the adapting is further based on one or more of an activity state of the radio node, a type of radio environment in which the radio node is located, and a speed of the radio node.

11. The method of claim 1, further comprising sending capability information to another radio node or a network node, said capability information indicating that the radio node is capable of adapting the number of currently performed parallel measurements or channel receptions based on at least one enhanced receiver characteristic the and one or more of the current information, type information, and interference information.

12. The method of claim 1, wherein the adapting is further based on at least one instruction received from a network node.

13. The method of claim 1, wherein the method comprises adapting the number of current parallel measurements being performed, based on at least one enhanced receiver characteristic and one or more of the current information, the type information, and the interference information.

14. The method of claim 1, wherein the method comprises adapting the number of channel receptions being performed, based on at least one enhanced receiver characteristic and one or more of the current information, the type information, and the interference information.

15. A radio node for adapting parallel measurements or channel receptions, or both, when an enhanced receiver is in use, the radio node comprising:
  processing circuitry configured to obtain current information or type information, or both, said current information being associated with a total number of current parallel measurements or channel receptions being performed, or both, said type information being associated with a type of each parallel measurement or channel reception being performed;
  the processing circuitry being further configured to obtain interference information,
  wherein said interference information is associated with interference; and
  the processing circuitry being further configured to adapt the number of current parallel measurements or channel receptions being performed, or both, the adapting being based on at least one enhanced receiver characteristic and one or more of the current information, the type information, and the interference information.

16. The radio node of claim 15, wherein the processing circuitry is further configured to receive, from another radio node or network node, one or more of the current information, the type information, and the interference information.

17. The radio node of claim 15, wherein the at least one enhanced receiver characteristic comprises any one or more of a number of interferers, a number of interfering transmitters, a number of interfering cells whose interference is fully or partly eliminated by the enhanced receiver, received signal strength of interferers whose interference is fully or partially eliminated by the enhanced receiver, types of channels or signals whose interference is fully or partially eliminated by the enhanced receiver, a number of different types of channels or signals on which the enhanced receiver is used, an ability to handle high interference without or with assistance data for interference handling, the enhanced receiver's ability to handle the interference by applying interference cancellation, the enhanced receiver's ability to handle the interference by applying interference suppression, and the enhanced receiver's ability to handle the interference by applying interference rejection.

18. The radio node of claim 15, wherein the processing circuitry is further configured to adapt the number of current parallel measurements or channel receptions being performed based on at least one of an amount of usage of an enhanced receiver, an amount of power consumption, a measurement pattern, and a battery energy level.

19. The radio node of claim 15, wherein the interference information comprises at least one of a number of interfering radio nodes or interfering cells, time-frequency resources associated with interfering transmissions, received signal strength of at least one interferer, a type of interfering signals or channels, a measurement pattern, and assistance data for interference handling.

20. The radio node of claim 15, wherein the processing circuitry is further configured to control a usage of the enhanced receiver.

21. The radio node of claim 15, wherein the processing circuitry is further configured to control at least one parameter related to the current number of parallel measurements or channel receptions being performed, or both.

22. The radio node of claim 15, wherein the processing circuitry is further configured to provide a priority ranking of parallel measurements or channel reception, based on a level of interference.

23. The radio node of claim 15, wherein the processing circuitry is further configured to halt a performance of at least one measurement or channel reception that requires usage of the enhanced receiver.

24. The radio node of claim 15, wherein the processing circuitry is further configured to reduce an intensity of the enhanced receiver when a number of interferers requiring an enhanced receiver for a measurement or channel reception exceeds a threshold.

25. The radio node of claim 15, wherein the processing circuitry is further configured to adapt the number of current parallel measurements or channel receptions, or both, based on one or more of an activity state of the radio node, a type of radio environment in which the radio node is located, and a speed of the radio node.

26. The radio node of claim 15, further comprising interface circuitry configured to send capability information to another radio node or a network node, said capability information indicating that the radio node is capable of adapting the number of currently performed parallel measurements or channel receptions, or both, based on at least one enhanced receiver characteristic and one or more of the current information, type information and interference information.

27. The radio node of claim 15, wherein the processing circuitry is further configured to adapt the number of current parallel measurements or channel receptions, or both, based on at least one instruction received from a network node.

28. The radio node of claim 15, wherein the radio node is a measuring node, a base station, or a user equipment.

29. The radio node of claim 15, wherein the processing circuitry is configured to adapt the number of current parallel measurements being performed, based on at least one enhanced receiver characteristic and one or more of the current information, the type information, and the interference information.

30. The radio node of claim 15, wherein the processing circuitry is configured to adapt the number of channel receptions being performed, based on at least one enhanced receiver characteristic and one or more of the current information, the type information, and the interference information.

31. A method, in a network node, for configuring measurements or channel receptions for a radio node, or both, by accounting for an enhanced receiver utilization, the network node being comprised in a radio network, the method comprising:
  determining a number of parallel measurements or channel receptions being performed by the radio node, or both;
  determining the radio node's capability to perform or adapt parallel measurements or receive channels; and
  sending, to the radio node or another network node, at least one instruction, based on the determined number of measurements or channel receptions and the determined capability.

32. The method of claim 31, wherein the at least one instruction is further based on a level of interference from at least one interfering radio node or cell or at least one characteristic of an enhanced receiver, or both.

33. The method of claim 32, wherein the level of interference further comprises a number of interference radio nodes or interfering cells whose interference is at least partially eliminated by the enhanced receiver, or a received signal strength of the at least one interfering radio node, or both.

34. The method of claim 31, further comprising applying said at least one instruction, within the network node, and performing measurements based on the applying.

35. A network node for configuring measurements or channel receptions, or both, for a radio node, by accounting for an enhanced receiver utilization, the network node being comprised in a radio network, the network node comprising:
  processing circuitry configured to determine a number of parallel measurements or channel receptions being performed by the radio node;
  the processing circuitry being further configured to determine the radio node's capability to perform or adapt parallel measurements or receive channels; and
  interface circuitry configured to send, to the radio node or another network node, at least one instruction, based on the determined number of measurements or channel receptions and the determined capability.

36. The network node of claim 35, wherein the at least one instruction is further based on a level of interference from at least one interfering radio node or cell or at least one characteristic of the enhanced receiver, or both.

37. The network node of claim 36, wherein the level of interference further comprises a number of interference radio nodes or interfering cells whose interference is at least partially eliminated by the enhanced receiver, or a received signal strength of the at least one interfering radio node, or both.

38. The network node of claim 36, wherein the at least one characteristic of the enhanced receiver comprises one or more of a type or number of channel or signal utilized by the enhanced receiver, a type of control channel utilized by the enhanced receiver, and an availability or detail level of assistance information used by the enhanced receiver.

39. The network node of claim 35, wherein the processing circuitry is further configured to apply said at least one instruction, within the network node, and performing measurements based on the at least one instruction.

40. The network node of claim 35, wherein the network node is a base station or a positioning node.

* * * * *